Oct. 28, 1941.  E. F-G. GIBBS  2,260,373
OFFSET TURNING TOOL
Filed Sept. 2, 1938

Edward F-G. Gibbs INVENTOR.

Patented Oct. 28, 1941

2,260,373

UNITED STATES PATENT OFFICE 2,260,373

OFFSET TURNING TOOL

Edward F-G. Gibbs, Detroit, Mich.

Application September 2, 1938, Serial No. 228,153

5 Claims. (Cl. 29—96)

Figure 1:
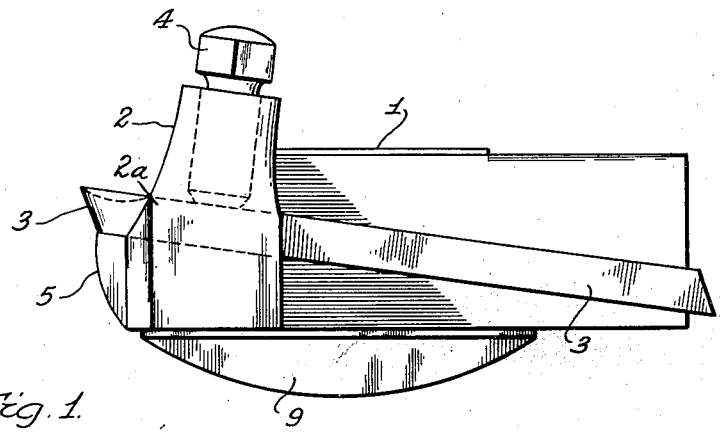
Figure 2:
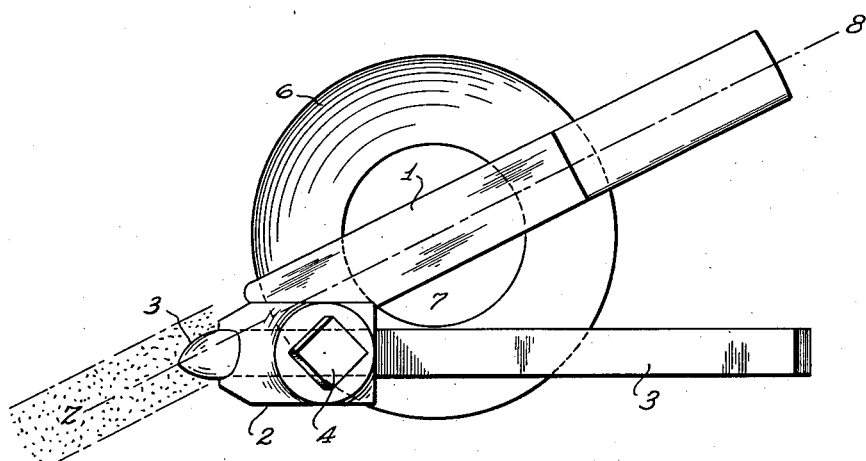

This invention relates to tools of the type such as have been used for many years on engine lathes and other machine tools, and wherein a relatively small piece of tool steel is adjustably and detachably mounted on a tool holder construction of less expensive material than the higher priced tool steel bit. Large numbers of tools of the type set forth have been used for many years in machine-shops, such tools being of several types, the most commonly used tool holder being what is known to machinists as a straight tool holder. For certain types of work or operations, it is desirable to employ the type of tool holder known as an off-set tool, for the purpose of enabling the workman to perform a cut close to the face plate or chuck of a lathe. The off-set tools of the removable bit type heretofore employed were so constructed that when the tool was set in the tool post of the lathe, the cutting edge of the tool projected beyond the tool post a considerable distance and was off-set with respect to a radial line passing through the center of the tool post so that when the tool was performing its cutting operation, and particularly when taking a heavy cut on the side cutting edge, a heavy torsional strain was impressed upon the tool and tool post tending to rotate the tool and tool post into the work and with the consequent danger of spoiling or marring the work piece. The present invention has for its object the improvement upon the construction of off-set movable bit tools of the type described and particularly to overcome the objectionable features above set forth for tools of this character. The above and other objects of the present invention will appear more fully from the following more detailed description and by reference to the accompanying drawing forming a part hereof and wherein:

Fig. 1 is a side elevation of a tool construction in accordance with the present invention and showing the manner in which the tool is mounted upon the ring of the tool post holder. Fig. 2 is a plan view of the tool holder shown in Fig. 1.

The tool holder consists of a main shank portion 1, having an integral off-set head portion 2. The said portion 2 is provided with a through aperture 2a of rectangular cross section and extending at an angle horizontally as shown most clearly in Fig. 1. The aperture 2a is designed for the reception of a tool bit 3 adapted to be inserted within the aperture 2a and to be clamped upon the lower supporting face of the aperture by means of the usual set-screw 4. The off-set head 2 of the tool holder extends forwardly to provide a supporting knee slightly narrower width than the width of the head 2 and adapted to extend below the extreme outer cutting edge of the tool for supporting the same rigidly during a cutting operation.

As will be seen most clearly from Fig. 2 of the drawing, the off-set head 2 of the tool holder is formed as a projection or protuberance which extends laterally from the side edge of the shank 1 at the forward end thereof, the head 2 projecting laterally a sufficient distance so that if a long tool bit such as indicated by the reference character 3 is inserted in the aperture 2a, the projecting portion of the tool bit 3 will clear the tool post which, although not shown in the drawing, would be of a size such as represented by the circle 7 in Fig. 2. The tool holder is shown as supported on the usual tool holder ring 6, which is provided on its lower side with the usual curved or substantially spherical face 9 for permitting vertical adjustment of the tool for the purpose of setting the cutting edge 3 thereof at the correct cutting height relative to the work. The amount of lateral extension of the head 2 is also such that when a tool bit 3 is properly supported in the head 2 with the outer cutting edge thereof resting upon the knee 5 of the tool head, the cutting edge of the tool will lie substantially upon the radial line 8 extending through the center of the tool post.

As will be seen from the foregoing description and by inspection of Fig. 2, if the tool bit 3 is properly adjusted in the head portion so that the cutting edge thereof is placed immediately above and supported by the knee portion 5, any setting of the tool holder in the tool post will always bring the cutting edge of the tool bit 3 on the radial line 8 so that the objectional torsional strains, such as encountered in off-set tool holders as heretofore constructed and which tended to rotate the tool holder in a clock-wise direction as viewed in Fig. 2, are largely minimized if not entirely eliminated. It will be understood that while I have illustrated and described a satisfactory and preferred embodiment of my invention, many changes, variations and modifications thereof may be resorted to without departing from the spirit of my invention.

I claim:

1. An off-set turning tool comprising a tool shank having an integral head projecting laterally from the side of said shank at the forward edge thereof, said head being provided with means for detaching and supporting a tool bit therein, a tool bit mounted within said means with its cutting edge located substantially in the vertical plane that passes through the longitudinal center line of said shank.

2. A tool holder comprising a main shank portion adapted to be clamped in the tool post of a machine tool, a tool bit supporting head projecting laterally from the side of said shank at the forward end thereof with the major portion of said head terminating at its forward end in alignment with the forward edge of said shank and said head having a reduced forwardly extending knee, a tool bit detachably mounted within said head and having its forward cutting edge supported by said knee substantially in a vertical plane passing through the longitudinal center line of said shank portion.

3. A tool holder adapted to be inserted in the tool post of a machine tool comprising a shank portion, a tool bit supporting head projecting laterally from said shank at the forward end thereof and being provided with tool bit supporting means extending at an angle to the longitudinal center line of said shank portion such that when a tool bit is mounted within said head the forward cutting edge of the tool will lie substantially in a vertical plane passing through the longitudinal center line of said shank portion and the rearwardly extending part of said tool bit will clear the tool post in which said tool bit is mounted.

4. An off-set turning tool adapted to be supported in the tool post of a machine tool comprising a tool shank, an integral head therewith, a tool bit extending through and clamped within said tool head having its cutting point lying substantially in the plane of the central line of resistance offered to the cutting force of said bit by said shank, and with the rearward extension of said bit clearing said tool post on one side thereof, and means for clamping the said tool bit in the said head.

5. An off-set turning tool adapted to be supported in the tool post of a machine tool comprising a tool shank, an integral head therewith, a tool bit extending through and clamped within said tool head having its cutting point lying substantially in the plane of the central line of resistance offered to the cutting force of said bit by said shank, and with the rearward extension of said bit clearing said tool post on one side thereof, and means for clamping the said tool bit in the said head, and said head having at its forward end an extended knee support to rigidly brace the cutting edge of said tool bit against vertical movement.

EDWARD F-G. GIBBS.